United States Patent
Guim Bernat et al.

(10) Patent No.: US 12,332,740 B2
(45) Date of Patent: Jun. 17, 2025

(54) APPLICATION AWARE MEMORY PATROL SCRUBBING TECHNIQUES

(71) Applicant: Intel Corporation, Santa Clara, CA (US)

(72) Inventors: Francesc Guim Bernat, Barcelona (ES); Karthik Kumar, Chandler, AZ (US); Mark A. Schmisseur, Phoenix, AZ (US); Thomas Willhalm, Sandhausen (DE); Marcos E. Carranza, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 17/356,338

(22) Filed: Jun. 23, 2021

(65) Prior Publication Data

US 2021/0318929 A1    Oct. 14, 2021

(51) Int. Cl.
| | |
|---|---|
| *G06F 11/10* | (2006.01) |
| *G06F 9/455* | (2018.01) |
| *G06F 9/50* | (2006.01) |
| *G06F 12/02* | (2006.01) |

(52) U.S. Cl.
CPC ...... *G06F 11/1068* (2013.01); *G06F 9/45558* (2013.01); *G06F 9/5016* (2013.01); *G06F 11/106* (2013.01); *G06F 12/0238* (2013.01); G06F 2009/45583 (2013.01); G06F 2009/45595 (2013.01)

(58) Field of Classification Search
CPC ............... G06F 11/1068; G06F 11/106; G06F 12/0238; G06F 9/45558; G06F 9/5016; G06F 2009/45583; G06F 2009/45595
See application file for complete search history.

(56) References Cited

U.S. PATENT DOCUMENTS

| | | | | |
|---|---|---|---|---|
| 4,479,214 A | * | 10/1984 | Ryan | G06F 11/10 |
| | | | | 714/42 |
| 5,918,248 A | * | 6/1999 | Newell | G06F 9/5016 |
| | | | | 711/147 |
| 2018/0173588 A1 | * | 6/2018 | Bacchus | G06F 11/106 |
| 2020/0371862 A1 | * | 11/2020 | Thompson | G06F 12/0879 |

\* cited by examiner

*Primary Examiner* — Guy J Lamarre
(74) *Attorney, Agent, or Firm* — Compass IP Law PC (57) ABSTRACT

Methods and apparatus for application aware memory patrol scrubbing techniques. The method may be performed on a computing system including one or more memory devices and running multiple applications with associated processes. The computer system may be implemented in a multi-tenant environment, where virtual instances of physical resources provided by the system are allocated to separate tenants, such as through virtualization schemes employing virtual machines or containers. Quality of Service (QoS) scrubbing logic and novel interfaces are provided to enable memory scrubbing QoS policies to be applied at the tenant, application, and/or process level. This QoS policies may include memory ranges for which specific policies are applied, as well as bandwidth allocations for performing scrubbing operations. A pattern generator is also provided for generating scrubbing patterns based on observed or predicted memory access patterns and/or predefined patterns.

20 Claims, 7 Drawing Sheets

APPLICATION AWARE MEMORY PATROL SCRUBBING TECHNIQUES

BACKGROUND INFORMATION

With cloud deployments involving tens of thousands of servers at scale, memory errors have come into sharp focus in recent times. As an example, SAP HANA deployments involve servers than span on average 2-4 TB (Terabytes) of memory in a single node, and major hyperscalers deploy thousands of such servers.

Memory errors are currently addressed using several approaches. Machine check architecture recovery solutions offer various options and flows to recover from memory errors. The simplest case is a hardware correctable error, which can be fixed entirely by hardware with no involvement required from the software stack.

In cases where the error is not correctable, the software stack needs to get involved. One approach is handled by the operating system (OS), which is notified of the error. If the page (having an address range that includes the error) is unused, then the page can be unmapped by the OS, and marked appropriately, as a result of which there is no loss of application data due to the uncorrectable error. If the page is used, then the application is signaled. Many applications, including databases, have some capabilities to compensate for the uncorrectable error and restore leverage application-level checksums (different from hardware error correction code (ECC)) in order to reconstruct, or restore the data from disk, in some cases.

Further, patrol scrubbing is an important mechanism against memory errors, as it is designed to address multi-bit errors that cannot be corrected by ECC algorithms. Scrubbing takes advantage of the low probability of having two strikes in the same word at any given time. The current use of patrol scrubbing is to periodically cycle the memory through the ECC logic in order to correct single-bit errors before they accumulate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for application aware memory patrol scrubbing techniques are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Currently, the patrol scrub option can be selected in the BIOS as a parameter, for example, the default may be to scrub through the entire memory once every 24 hours. There are options to increase the frequency for high reliability deployments, and this may be as often as every few hours. Given that this is an important preventive tool for an increasingly prevalent problem, the embodiments disclosed herein better leverage patrol scrubbing mechanisms to prevent and mitigate memory errors. The disclosed techniques are based, in part, on the following key observations.

First, all memory ranges are not equal from an application standpoint, both from an error-prevention standpoint, and also from an error correction standpoint. For example, for an in-memory database, certain regions of memory are read-only and duplicated in disk. An error in these regions can be fixed by restoring the data from disk. Further, certain regions of memory are used for statistical accounting and bookkeeping for database internal efficiencies, and errors in those regions can be tolerated without any loss of business continuity. In view of this, patrol scrubbing efforts could be guided by application or operating system hints to focus intensely on memory regions that are critical from a business continuity perspective.

Second, given the availability of the patrol scrubber to periodically perform memory "scrubbing," especially for those memory regions that are critical from a reliability perspective, it is advantageous to provide the patrol scrubber additional capabilities for scrubbing outside of ECC. For example, using application level hints or linkage to application level checksums.

Third, Patrol scrubbing takes up bandwidth and does not come for "free". That is why there is a tendency to go with the infrequent 24 hour or once in X hour patrol scrub so that application performance is not impacted. There are two key factors to consider here—First, an "important" memory range from a loss-of-information perspective is not always a bandwidth-intensive memory range. For example, analytics processing (heavy on bandwidth) is often on read-only data, which is often not as critical as say a transaction processing (not as heavy on bandwidth as analytics) region, where critical modifications have been made to the data. Second, if a region is indeed important, there are techniques in RAS (Reliability, availability and serviceability) today, like intra-DIMM sub-region mirroring that can be leveraged in combination with patrol scrubbing to preserve bandwidth. A key insight is that one needs fewer, specific regions to focus such techniques on, and the current approach treating the entire memory system as a monolith makes it impossible to use such combination of techniques, as we simply don't have enough capacity/resources.

The embodiments described and illustrated herein address the foregoing problems by providing unique differentiation with an adaptive patrol scrubber, which can focus intensely on ranges specified by the OS and/or application software, and also expand capabilities for check-summing and correction logic to include application specific logic. Moreover, the embodiments our notion of Quality of Service (QoS) in the memory subsystem—which historically focused on cache capacity and memory bandwidth—to also include memory reliability, and expands the QoS APIs to include specification of critical memory ranges where loss of information would mean loss of business continuity.

One aspect of the embodiments is new logic in the memory controller that allows a software stacks (e.g., an operating system) to control different levels of quality of service associated with how memory scrubbing is performed per different processes and potentially different memory ranges. This is implemented by memory scrubber QoS logic, as shown in the Figures herein, including FIG. 1 below. The new logic also includes a bit stream pattern generator, which is responsible for generating the memory address patterns that the scrubbing logic has access to and could follow. Similar to the memory scrubber QoS logic, the memory address patterns can be per process or per process and address space. This allows the software stack to implement specific flows (e.g., given sparse accesses for a process following pointer chasing on relevant structures, there's no need to scrub all addresses but rather focus on the sparse access paths that are important to the application).

Figure 1:
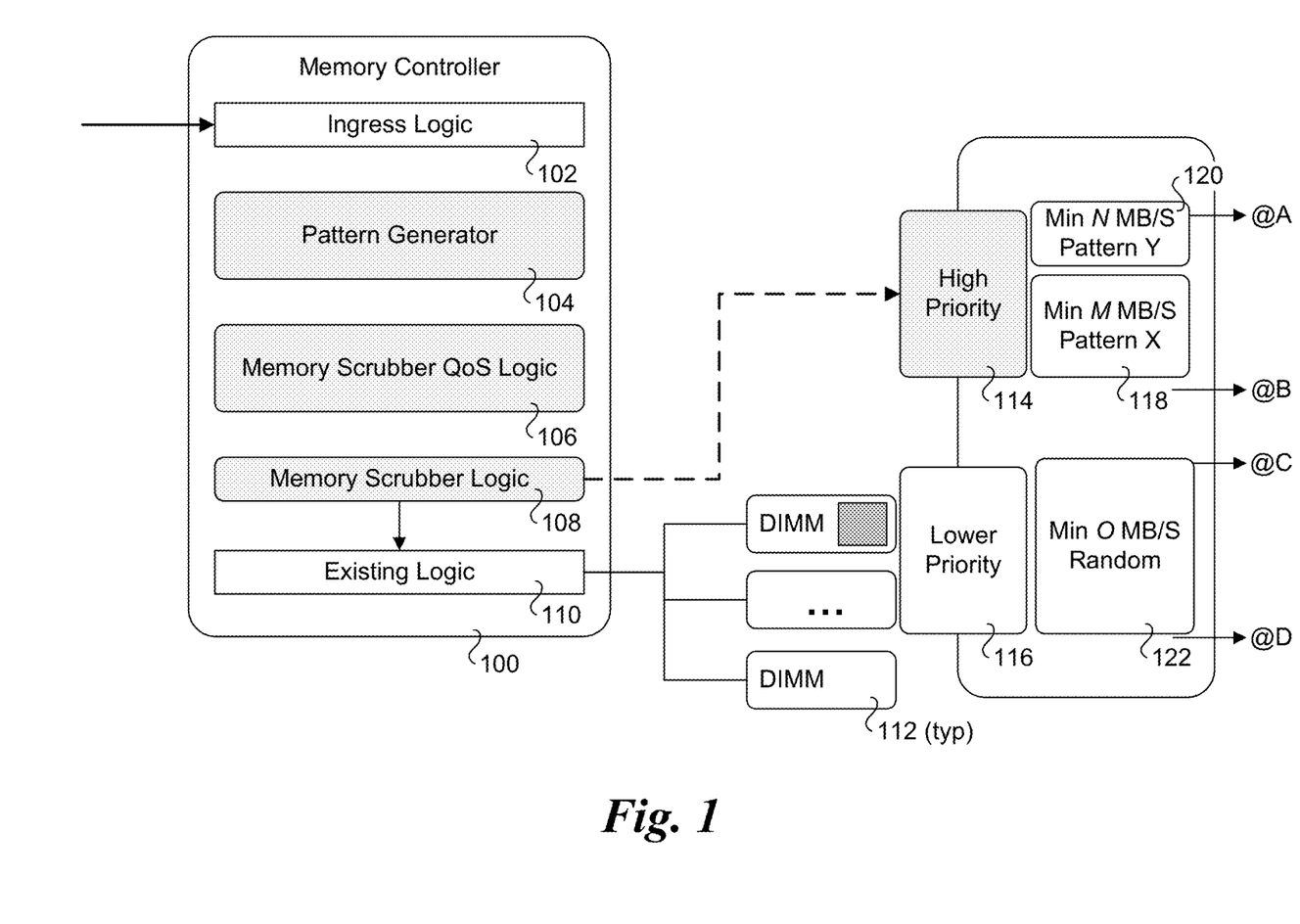
FIG. 1 is schematic diagram illustrating a high-level description of a memory controller architecture for implementing memory scrubber QoS logic, according to one embodiment.

FIG. 1 provides a high-level description of these new basic blocks included in the memory controller architecture. A memory controller 100 includes ingress logic 102, a pattern generator 104, memory scrubber QoS logic 106, memory scrubber logic 108, and existing logic 110. Memory controller 100 is coupled to multiple DIMMs (dual inline memory modules) 112. An address space of DIMM 112 is partitioned into different regions, as described below.

Memory scrubber QoS logic 106 controls how the bandwidth allocated to memory scrubbing is allocated to different applications (e.g., as identified by a process address id (PASID)) and potentially within different memory ranges. In the example shown in FIG. 1, two different policies are defined for two processes, as depicted by a high priority policy 114, and a lower priority policy 116. The high priority policy 114 is applied to two memory ranges 118 and 120. For memory range 118, a memory scrubber pattern 'X' generated by pattern generator 104 using a maximum bandwidth of M MB/s. A memory scrubber pattern 'Y' generated by pattern generator 104 as applied for memory range 120 using a maximum bandwidth of N MB/s Generally, a low priority policy may employ conventional patrol scrubbing operations, such as performing the minimum amount of scrubbing required. For example, lower priority policy 116 is applied to a region 122 using a random access pattern with a minimum scrub rate (such as scrub this range every hour) using an optional maximum bandwidth of P MB/s.

The techniques provide herein include a simple approach (e.g., following simple stride patterns) and more complex approaches based on small acceleration logic (e.g., to generate specific patterns based on the read content). Generation of stride patterns and specific patterns are discussed below.

Figure 2:
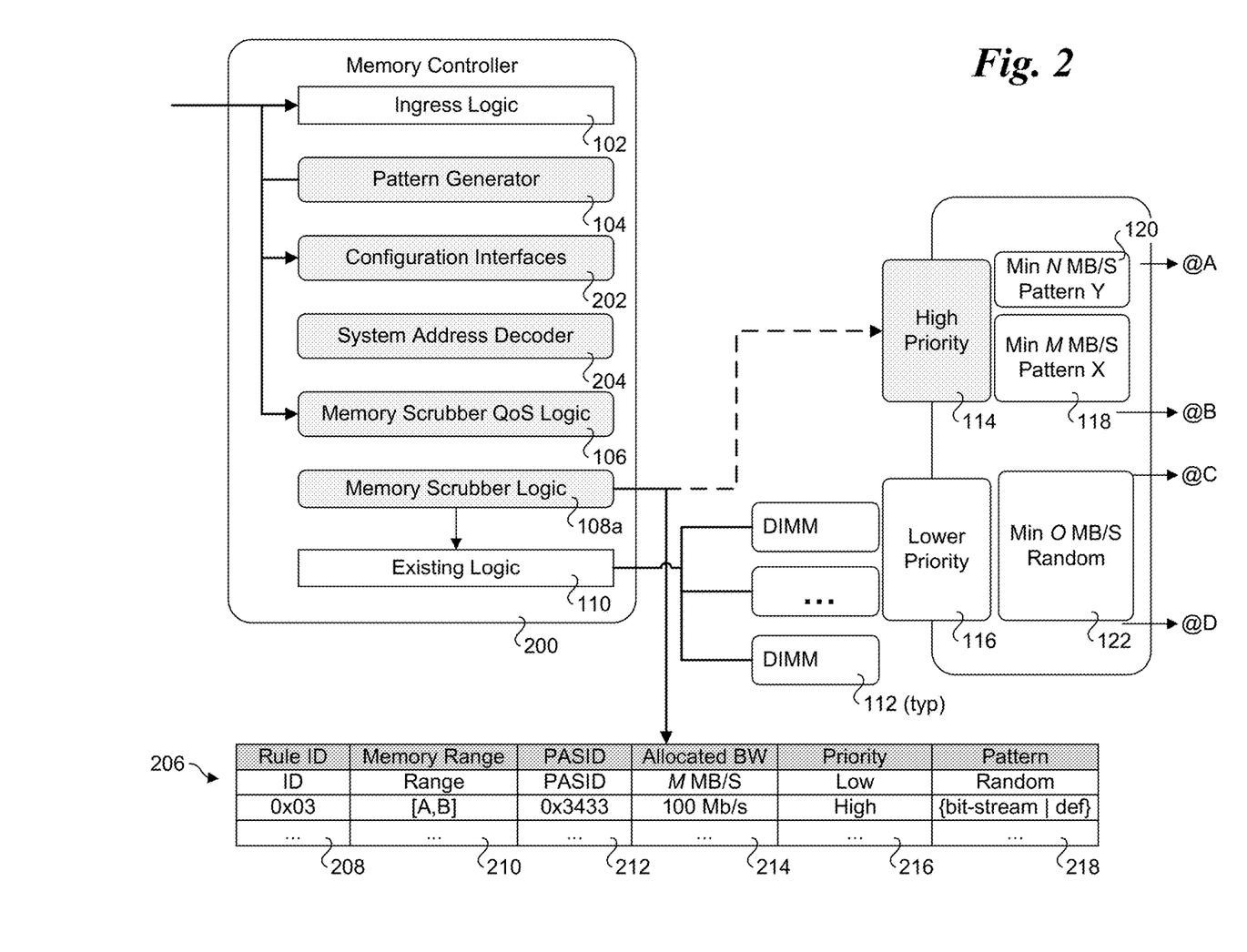
FIG. 2 is a schematic diagram illustrating further details of a memory controller architecture for implementing memory scrubber QoS logic, according to one embodiment.

FIG. 2 shows additional details of novel enhancements to a memory controller 200 to support the extended memory scrubbing functionality described herein. In FIGS. 1 and 2, components/blocks with like-reference numbers perform similar functions. In addition to the previously identified blocks and logic, memory controller 200 further includes configuration interfaces 202 and system address decoder 204 the operation of which are described below. As further shown, memory scrubber logic 108a accesses a table 206 in which various rules and associated parameters are stored.

A set of new interfaces are exposed by the memory controller in order to allow the software stack to configure the method. These interfaces can either be implement with model-specific registers (MSRs), ENQ (Enqueue) commands or any similar apparatus. In one embodiment they are in RING 0 to avoid user space programs to affect RAS features. In one embodiment, three new interfaces are provided.

A first interface enables an operator and/or control software or firmware, such as an operating system, to specify the overall memory bandwidth that can be consumed for scrubbing. This interface may enable the memory bandwidth to be specified a conditional input or for the bandwidth to be added to the amount of current memory bandwidth used for other applications. The bandwidth may further be specified as:

i. A range of memory bandwidth utilization (e.g. [10%-60%] memory bandwidth used for regular read and write)

ii. Amount of memory bandwidth destinated for scrubbing (e.g., 50% out of the non-used bandwidth)

A second interface allows for specifying or selecting a specific memory scrubbing quality of service policy for a particular process represented by a process address ID (PASID). In one embodiment, this interface includes the following parameters:

i. The PASID for the application.

ii. An optional memory range that relates to the memory scrubbing QoS. If there is not an associated range, the QoS will be associated by default for all the address space for the process. Otherwise, the QoS will be mapped to the particular region (memory range) that is specified.

iii. The priority of the process. In cases where there are specific desired minimum scrubbing bandwidths, process priorities can be provided to distinguish among all the PASIDS.

iv. Specific minimum memory bandwidth associate to the QoS registration. The memory bandwidth has to be higher than the minimum that is required by design. This minimum bar is something that can be registered at the factory or may be configurable. If there is not enough amount of allocable memory scrubbing bandwidth the registration may fail.

Depending on the overall memory bandwidth that can be consumed for scrubbing, the required memory bandwidth may not be possible even after it has been allocated. In this case, a system interrupt may be generated to notify the Operating System that a registration of bandwidth cannot be satisfied.

A third interface enables a particular scrubbing pattern to be associated with a particular range (e.g., a memory range registered via the second interface). This may include:
i. The PASID for the application.
ii. The memory range associated.
iii. The memory pattern that needs to be associated.

In one embodiment, the memory pattern may be input using two different options: 1) Provide a pattern ID (e.g., stride) and parameter (e.g., 4); or 2) Provide a bit-stream that can be executed in a small acceleration unit that can generate specific patterns based on the know-how of the application.

Table 206 shows exemplary data used by the second interface. This includes a Rule ID field 208, a memory range field 210, a PASID field 212, an allocated bandwidth (BW) field 214, a priority field 216, and a pattern field 218. Rule ID field 208 contains a rule identifier, which may generally comprise a value or data to identify a rule, such as a number or alphanumeric string, for example. Memory range field 210 contains a memory range for which the rule applies, such as a start address and end address (e.g., Address A, Address B). PASID field 212 contains the PASID for the process. The allocated bandwidth is provided in allocated BW field 214.

Priority field 216 contains indicia associated with a priority level. Non-limiting examples of "Low" and "High" are shown in FIG. 2; however, indicia supporting greater priority granularity may also be used.

Pattern field 218 is used to either identify a pattern (e.g., "Random") or provide a pointer or the like to a given bit-stream or an identifier for the bit-stream used to program memory scrubber logic 108*a*. In addition to bit-streams, other patterns may be used as discussed herein.

Scrubbing Pattern Generation

Various techniques may be used for generating scrubbing patterns, including stride-based patterns and application-specific patterns. Under on aspect of the application-specific patterns, a given application or class of applications, such as a machine learning (ML) and/or artificial intelligence (AI) application or an application that is implemented in a cloud-hosted service may access memory at some addresses more frequently than other addresses. In some cases, some ranges of memory pages allocated for an application may be used very infrequently or not used at all. For example, an application may request allocation of memory that includes memory pages that will be used and may include other pages that might be used (depending on various conditions, user input, dynamic responses, etc.). Rather than allocating this memory on an as-needed basis, requesting allocation of memory that might be used ensures that memory is available for use (whether or not it is actually used).

Figure 3:
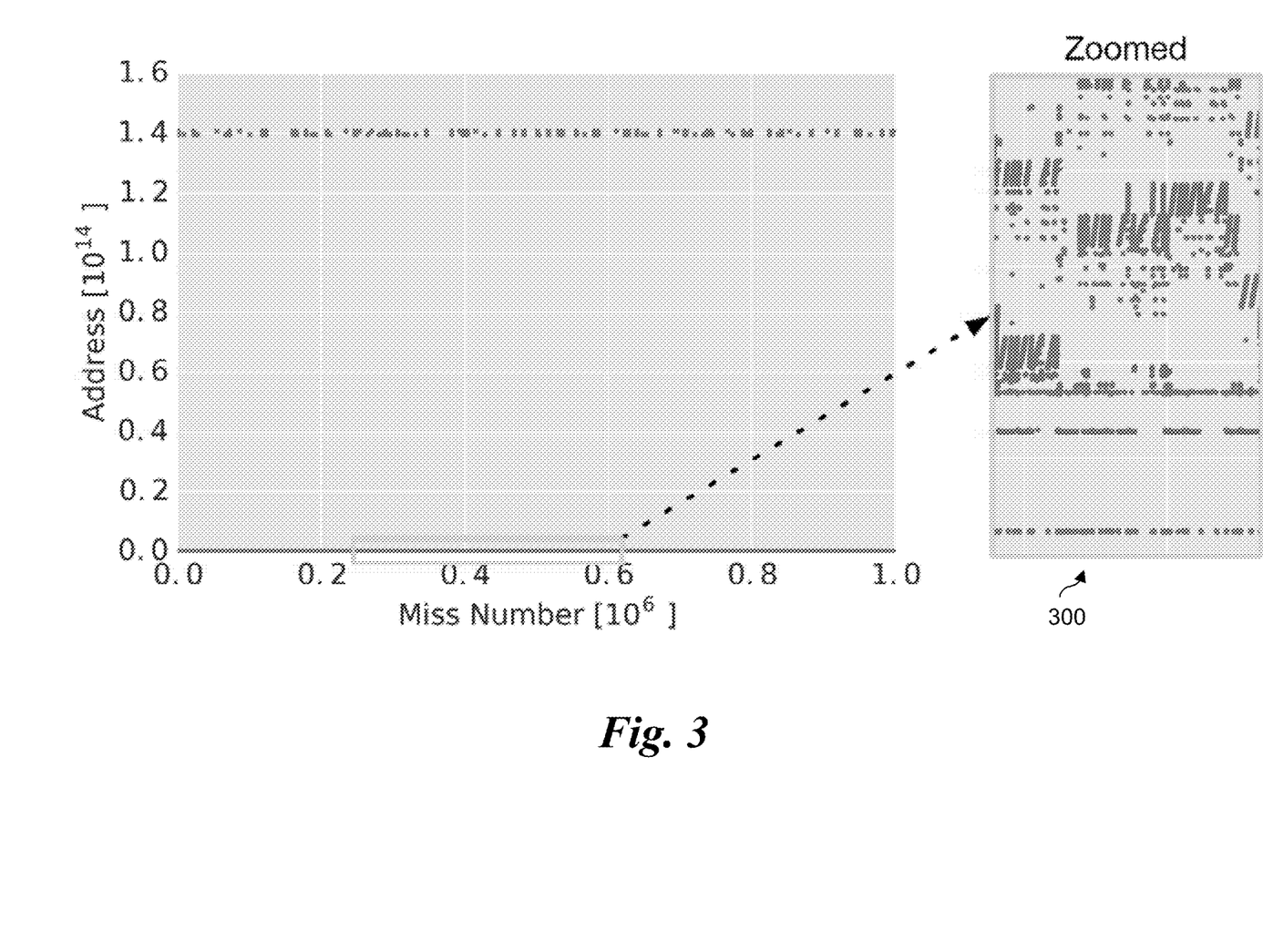
FIG. 3 is a graph and diagram illustrating an example of a sparse memory access pattern.

For some applications the access patterns may be sparse—that is, only a small (i.e., sparse) portion of the memory is actually accessed. An example of a sparse access pattern is shown in FIG. 3, where zoomed area 300 shows the cache miss addresses on the omnetpp dataset published in Hashemi, Milad, et al. "Learning memory access patterns." International *Conference on Machine Learning*. PMLR, 2018. The cache miss addresses correspond to memory access requests that resulted in cache misses (e.g., not in the cache hierarchy for a processor employ L1/L2 caches and a Last Level Cache (LLC)). This also reflects what portion of memory (what cache lines) is being read from system memory.

Since these cache lines are being accessed more frequently than other cache lines, it would be advantageous to scrub these cache lines more frequently to prevent data errors. In accordance with further aspects of some embodiments, one or more techniques and/or mechanisms are employed to monitor or predict memory access patterns and then use the monitored or predicted memory access pattern to identify portions of memory to scrub using a pattern access scheme.

Figure 4:
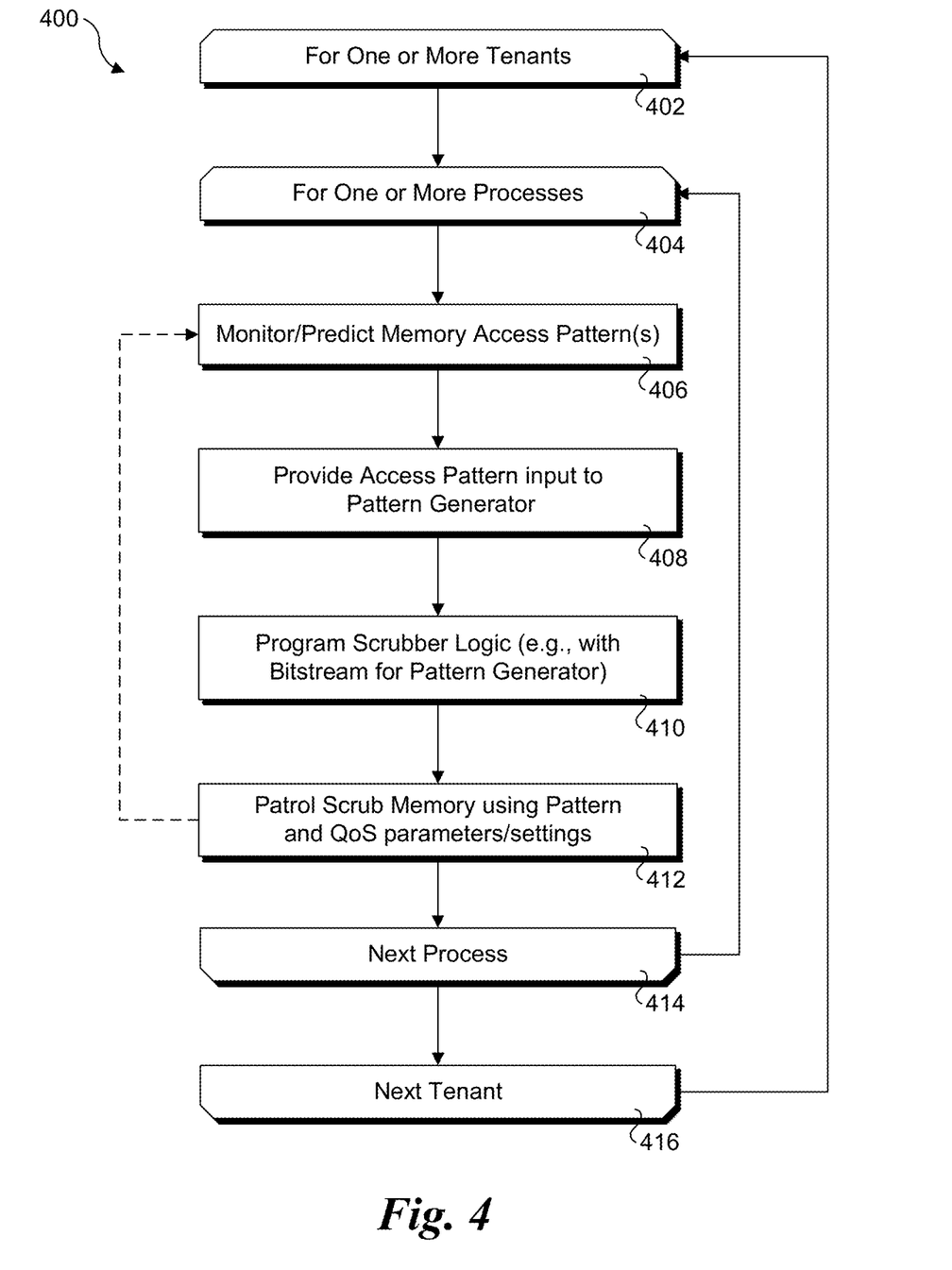
FIG. 4 is a flowchart illustrating operations performed using patrol scrubbing with patterns, according to one embodiment.

FIG. 4 shows a flowchart 400 illustrating operations performed using patrol scrubbing with patterns, according to one embodiment. As shown in the outer loop coupled between start and end loop blocks 402 and 416, the operations may be performed for one or more tenants for multi-tenant environments. As shown in the middle loop coupled between start and end loop blocks 404 and 414, the operations may be performed for one or more processes. In a block 406, memory access patterns are monitored and/or predicted. In a block 408 the monitored or predicted memory access pattern is provided to the pattern generator as an input. In a block 410, the pattern generator (and/or other logic) is used to program the scrubber logic. For example, in one embodiment an FPGA is used and is programmed by a bitstream to scrub memory addresses/cache lines corresponding to the monitored or predicted pattern. In a block 412, the memory is then scrubbed by using patrol scrubbing based on the pattern and the applicable QoS parameters and settings associated with the PASID for the process. As depicted by an optional loop back to block 406, the operations of blocks 406, 408, 410, and 412 may be performed on an ongoing basis to adjust the pattern used for patrol scrubbing based on the most recent monitored and/or predicted memory access patterns. In practice, the patrol scrubbing operations for multiple processes and (if applicable) multiple tenants may generally be performed in parallel, with the pattern being updated periodically Techniques for predicting memory access patterns are described in the aforementioned "Learning memory access patterns" paper. For example, in some embodiments, memory prefetching may be observed to determine a memory access pattern to employ using patrol scrubbing.

Prefetchers are hardware structures that predict future memory accesses from past memory access history. They generally can be separated into two categories: stride prefetchers and correlation prefetchers. Stride prefetchers are commonly implemented in modern processors and lock onto stable, repeatable deltas (differences between subsequent memory addresses). For example, given an access pattern that adds four to a memory address every time (0, 4, 8, 12), a stride prefetcher will learn that delta and try to prefetch ahead of the demand stream, launching parallel accesses to potential future address targets (16, 20, 24) up to a set prefetch distance. Correlation prefetchers try to learn patterns that may repeat, but are not as consistent as a single stable delta. They store the past history of memory accesses in large tables and are better at predicting more irregular patterns than stride prefetchers. Examples of correlation prefetchers include Markov prefetchers, GHB prefetchers, and more recent work that utilizes larger in-memory structures.

Figure 5:
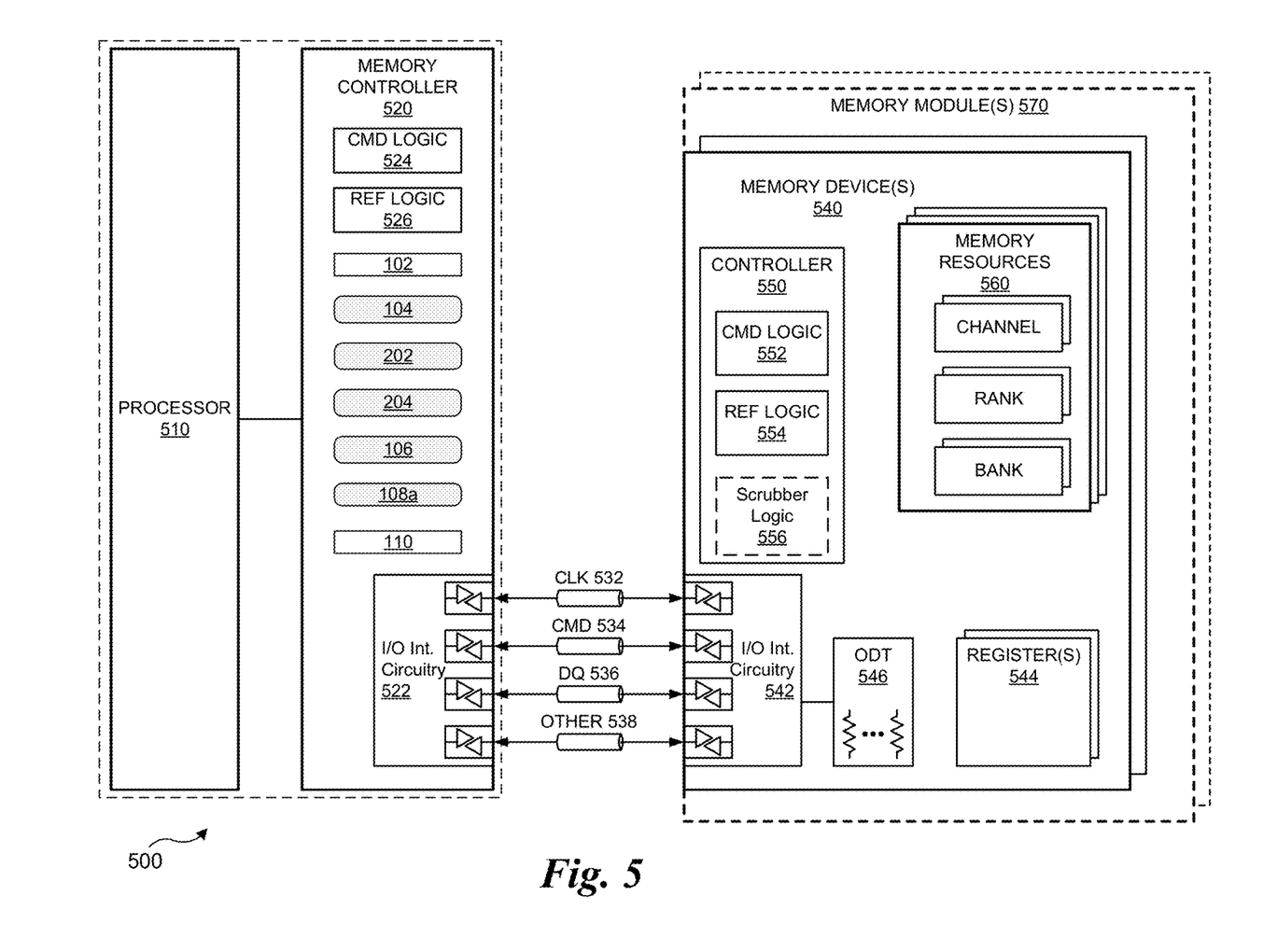
FIG. 5 is a schematic diagram of an example system including a memory controller coupled to memory modules, wherein the system is configured to implement patrol memory scrubbing in accordance with aspects of embodiments herein.

FIG. 5 illustrates an example system 500. In some examples, as shown in FIG. 5, system 500 includes a processor and elements of a memory subsystem in a computing device. Processor 510 represents a processing unit of a computing system that may execute an operating system (OS) and applications, which can collectively be referred to as the host or the user of the memory subsystem. The OS and applications execute operations that result in memory accesses. Processor 510 can include one or more separate processors. Each separate processor may include a single processing unit, a multicore processing unit, or a combination. The processing unit may be a primary processor such as a central processing unit (CPU), a peripheral processor such as a graphics processing unit (GPU), or a combination. Memory accesses may also be initiated by devices such as a network controller or hard disk controller. Such devices may be integrated with the processor in some systems or attached to the processer via a bus (e.g., a PCI express bus), or a combination. System 500 may be implemented as a system on a chip (SOC) or may be implemented with standalone components.

Reference to memory devices may apply to different memory types. Memory devices often refers to volatile memory technologies such as DRAM. In addition to, or alternatively to, volatile memory, in some examples, reference to memory devices can refer to a nonvolatile memory device whose state is determinate even if power is interrupted to the device. In one example, the nonvolatile memory device is a block addressable memory device, such as NAND or NOR technologies. A memory device may also include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

Descriptions herein referring to a "RAM" or "RAM device" can apply to any memory device that allows random access, whether volatile or nonvolatile. Descriptions referring to a "DRAM", "SDRAM, "DRAM device" or "SDRAM device" may refer to a volatile random access memory device. The memory device, SDRAM or DRAM may refer to the die itself, to a packaged memory product that includes one or more dies, or both. In some examples, a system with volatile memory that needs to be refreshed may also include at least some nonvolatile memory.

Memory controller 520, as shown in FIG. 5, may represent one or more memory controller circuits or devices for system 500. Also, memory controller 520 may include logic and/or features that generate memory access commands in response to the execution of operations by processor 510. In some examples, memory controller 520 may access one or more memory device(s) 540. For these examples, memory device(s) 540 may be SDRAM or DRAM devices in accordance with any referred to above. Memory device(s) 540 may be organized and managed through different channels, where these channels may couple in parallel to multiple memory devices via buses and signal lines. Each channel may be independently operable. Thus, separate channels may be independently accessed and controlled, and the timing, data transfer, command and address exchanges, and other operations may be separate for each channel. Coupling may refer to an electrical coupling, communicative coupling, physical coupling, or a combination of these. Physical coupling may include direct contact. Electrical coupling, for example, includes an interface or interconnection that allows electrical flow between components, or allows signaling between components, or both. Communicative coupling, for example, includes connections, including wired or wireless, that enable components to exchange data.

According to some examples, settings for each channel are controlled by separate mode registers or other register settings. For these examples, memory controller 520 may manage a separate memory channel, although system 500 may be configured to have multiple channels managed by a single memory controller, or to have multiple memory controllers on a single channel. In one example, memory controller 520 is part of processor 510, such as logic and/or features of memory controller 520 are implemented on the same die or implemented in the same package space as processor 510, sometimes referred to as an integrated memory controller.

Memory controller 520 includes Input/Output (I/O) interface circuitry 522 to couple to a memory bus, such as a memory channel as referred to above. I/O interface circuitry 522 (as well as I/O interface circuitry 542 of memory device(s) 540) may include pins, pads, connectors, signal lines, traces, or wires, or other hardware to connect the devices, or a combination of these. I/O interface circuitry 522 may include a hardware interface. As shown in FIG. 5, I/O interface circuitry 522 includes at least drivers/transceivers for signal lines. Commonly, wires within an integrated circuit interface couple with a pad, pin, or connector to interface signal lines or traces or other wires between devices. I/O interface circuitry 522 can include drivers, receivers, transceivers, or termination, or other circuitry or combinations of circuitry to exchange signals on the signal lines between memory controller 520 and memory device(s) 540. The exchange of signals includes at least one of transmit or receive. While shown as coupling I/O interface circuitry 522 from memory controller 520 to I/O interface circuitry 542 of memory device(s) 540, it will be understood that in an implementation of system 500 where groups of memory device(s) 540 are accessed in parallel, multiple memory devices can include I/O interface circuitry to the same interface of memory controller 520. In an implementation of system 500 including one or more memory module(s) 570, I/O interface circuitry 542 may include interface hardware of memory module(s) 570 in addition to interface hardware for memory device(s) 540. Other memory controllers 520 may include multiple, separate interfaces to one or more memory devices of memory device(s) 540.

In some examples, memory controller 520 may be coupled with memory device(s) 540 via multiple signal lines. The multiple signal lines may include at least a clock (CLK) 532, a command/address (CMD) 534, and write data (DQ) and read data (DQ) 536, and zero or more other signal lines 538. According to some examples, a composition of signal lines coupling memory controller 520 to memory device(s) 540 may be referred to collectively as a memory bus. The signal lines for CMD 534 may be referred to as a "command bus", a "C/A bus" or an ADD/CMD bus, or some other designation indicating the transfer of commands. The signal lines for DQ 536 may be referred to as a "data bus".

According to some examples, independent channels may have different clock signals, command buses, data buses, and other signal lines. For these examples, system 500 may be considered to have multiple "buses," in the sense that an independent interface path may be considered a separate bus. It will be understood that in addition to the signal lines shown in FIG. 5, a bus may also include at least one of strobe signaling lines, alert lines, auxiliary lines, or other signal lines, or a combination of these additional signal lines. It will also be understood that serial bus technologies can be used for transmitting signals between memory controller 520 and memory device(s) 540. An example of a serial bus technology is 8B10B encoding and transmission of high-speed data with embedded clock over a single differential pair of signals in each direction. In some examples, CMD 534 represents signal lines shared in parallel with multiple memory device(s) 540. In other examples, multiple memory devices share encoding command signal lines of CMD 534, and each has a separate chip select (CS_n) signal line to select individual memory device(s) 540.

In some examples, the bus between memory controller 520 and memory device(s) 540 includes a subsidiary command bus routed via signal lines included in CMD 534 and a subsidiary data bus to carry the write and read data routed via signal lines included in DQ 536. In some examples, CMD 534 and DQ 536 may separately include bidirectional lines. In other examples, DQ 536 may include unidirectional write signal lines to write data from the host to memory and unidirectional lines to read data from the memory to the host.

According to some examples, in accordance with a chosen memory technology and system design, signals lines included in other 538 may augment a memory bus or subsidiary bus. For example, strobe line signal lines for a DQS. Based on a design of system 500, or memory technology implementation, a memory bus may have more or less bandwidth per memory device included in memory device(s) 540. The memory bus may support memory devices included in memory device(s) 540 that have either a x32 interface, a x16 interface, a x8 interface, or other interface. The convention "xW," where W is an integer that refers to an interface size or width of the interface of memory device(s) 540, which represents a number of signal lines to exchange data with memory controller 520. The interface size of these memory devices may be a controlling factor on how many memory devices may be used concurrently per channel in system 500 or coupled in parallel to the same signal lines. In some examples, high bandwidth memory devices, wide interface memory devices, or stacked memory devices, or combinations, may enable wider interfaces, such as a x128 interface, a x256 interface, a x512 interface, a x1024 interface, or other data bus interface width.

According to some examples, memory device(s) 540 represent memory resources for system 500. For these examples, each memory device included in memory device(s) 540 is a separate memory die. Separate memory devices may interface with multiple (e.g., 2) channels per device or die. A given memory device of memory device(s) 540 may include I/O interface circuitry 542 and may have a bandwidth determined by an interface width associated with an implementation or configuration of the given memory device (e.g., x16 or x8 or some other interface bandwidth). I/O interface circuitry 542 may enable the memory devices to interface with memory controller 520. I/O interface circuitry 542 may include a hardware interface and operate in coordination with I/O interface circuitry 522 of memory controller 520.

In some examples, multiple memory device(s) 540 may be connected in parallel to the same command and data buses (e.g., via CMD 534 and DQ 536). In other examples, multiple memory device(s) 540 may be connected in parallel to the same command bus but connected to different data buses. For example, system 500 may be configured with multiple memory device(s) 540 coupled in parallel, with each memory device responding to a command, and accessing memory resources 560 internal to each memory device. For a write operation, an individual memory device of memory device(s) 540 may write a portion of the overall data word, and for a read operation, the individual memory device may fetch a portion of the overall data word. As non-limiting examples, a specific memory device may provide or receive, respectively, 8 bits of a 128-bit data word for a read or write operation, or 8 bits or 16 bits (depending for a x8 or a x16 device) of a 256-bit data word. The remaining bits of the word may be provided or received by other memory devices in parallel.

According to some examples, memory device(s) 540 may be disposed directly on a motherboard or host system platform (e.g., a PCB (printed circuit board) on which processor 510 is disposed) of a computing device. Memory device(s) 540 may be organized into memory module(s) 570. In some examples, memory module(s) 570 may represent dual inline memory modules (DIMMs). In some examples, memory module(s) 570 may represent other organizations or configurations of multiple memory devices that share at least a portion of access or control circuitry, which can be a separate circuit, a separate device, or a separate board from the host system platform. In some examples, memory module(s) 570 may include multiple memory device(s) 540, and memory module(s) 570 may include support for multiple separate channels to the included memory device(s) 540 disposed on them.

In some examples, memory device(s) 540 may be incorporated into a same package as memory controller 520. For example, incorporated in a multi-chip-module (MCM), a package-on-package with through-silicon via (TSV), or other techniques or combinations. Similarly, in some examples, memory device(s) 540 may be incorporated into memory module(s) 570, which themselves may be incorporated into the same package as memory controller 520. It will be appreciated that for these and other examples, memory controller 520 may be part of or integrated with processor 510.

As shown in FIG. 5, in some examples, memory device(s) 540 include memory resources 560. Memory resources 560 may represent individual arrays of memory locations or storage locations for data. Memory resources 560 may be managed as rows of data, accessed via wordline (rows) and bitline (individual bits within a row) control. Memory resources 560 may be organized as separate channels, ranks, and banks of memory. Channels may refer to independent control paths to storage locations within memory device(s) 540. Ranks may refer to common locations across multiple memory devices (e.g., same row addresses within different memory devices). Banks may refer to arrays of memory locations within a given memory device of memory device (s) 540. Banks may be divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to access memory resources 560. For example, the same physical memory locations can be accessed over a specific channel as a specific bank, which can also belong to a rank. Thus, the organization of memory resources 560 may be understood in an inclusive, rather than exclusive, manner.

According to some examples, as shown in FIG. 5, memory device(s) 540 include one or more register(s) 544. Register(s) 544 may represent one or more storage devices or storage locations that provide configuration or settings for operation memory device(s) 540. In one example, register(s) 544 may provide a storage location for memory device(s) 540 to store data for access by memory controller 520 as part of a control or management operation. For example, register (s) 544 may include one or more mode registers (MRs) and/or may include one or more multipurpose registers.

In some examples, writing to or programming one or more registers of register(s) 544 may configure memory device(s) 540 to operate in different "modes". For these examples, command information written to or programmed to the one or more register may trigger different modes within memory device(s) 540. Additionally, or in the alternative, different modes can also trigger different operations from address information or other signal lines depending on the triggered mode. Programmed settings of register(s) 544 may indicate or trigger configuration of I/O settings. For example, configuration of timing, termination, on-die termination (ODT), driver configuration, or other I/O settings.

According to some examples, memory device(s) 540 includes ODT 546 as part of the interface hardware associated with I/O interface circuitry 542. ODT 546 may provide settings for impedance to be applied to the interface to specified signal lines. For example, ODT 546 may be configured to apply impedance to signal lines include in DQ 536 or CMD 534. The ODT settings for ODT 546 may be changed based on whether a memory device of memory device(s) 540 is a selected target of an access operation or a non-target memory device. ODT settings for ODT 546 may affect timing and reflections of signaling on terminated signal lines included in, for example, CMD 534 or DQ 536. Control over ODT setting for ODT 546 can enable higher-speed operation with improved matching of applied impedance and loading. Impedance and loading may be applied to specific signal lines of I/O interface circuitry 542, 522 (e.g., CMD 534 and DQ 536) and is not necessarily applied to all signal lines.

In some examples, as shown in FIG. 5, memory device(s) 540 includes controller 550. Controller 550 may represent control logic within memory device(s) 540 to control internal operations within memory device(s) 540. For example, controller 550 decodes commands sent by memory controller 520 and generates internal operations to execute or satisfy the commands. Controller 550 may be referred to as an internal controller and is separate from memory controller 520 of the host. Controller 550 may include logic and/or features to determine what mode is selected based on programmed or default settings indicated in register(s) 544 and configure the internal execution of operations for access to memory resources 560 or other operations based on the selected mode. Controller 550 generates control signals to control the routing of bits within memory device(s) 540 to provide a proper interface for the selected mode and direct a command to the proper memory locations or addresses of memory resources 560. Controller 550 includes command (CMD) logic 552, which can decode command encoding received on command and address signal lines. Thus, CMD logic 552 can be or include a command decoder. With command logic 552, memory device can identify commands and generate internal operations to execute requested commands.

Referring again to memory controller 520, memory controller 520 includes CMD logic 524, which represents logic and/or features to generate commands to send to memory device(s) 540. The generation of the commands can refer to the command prior to scheduling, or the preparation of queued commands ready to be sent. Generally, the signaling in memory subsystems includes address information within or accompanying the command to indicate or select one or more memory locations where memory device(s) 540 should execute the command. In response to scheduling of transactions for memory device(s) 540, memory controller 520 can issue commands via I/O interface circuitry 522 to cause memory device(s) 540 to execute the commands. In some examples, controller 550 of memory device(s) 540 receives and decodes command and address information received via I/O interface circuitry 542 from memory controller 520. Based on the received command and address information, controller 550 may control the timing of operations of the logic, features and/or circuitry within memory device(s) 540 to execute the commands. Controller 550 may be arranged to operate in compliance with standards or specifications such as timing and signaling requirements for memory device(s) 540. Memory controller 520 may implement compliance with standards or specifications by access scheduling and control.

In some examples, memory controller 520 includes refresh (REF) logic 526. REF logic 526 may be used for memory resources that are volatile and need to be refreshed to retain a deterministic state. REF logic 526, for example, may indicate a location for refresh, and a type of refresh to perform. REF logic 526 may trigger self-refresh within memory device(s) 540 or execute external refreshes which can be referred to as auto refresh commands by sending refresh commands, or a combination. According to some examples, system 500 supports all bank refreshes as well as per bank refreshes. All bank refreshes cause the refreshing of banks within all memory device(s) 540 coupled in parallel. Per bank refreshes cause the refreshing of a specified bank within a specified memory device of memory device(s) 540. In some examples, controller 550 within memory device(s) 540 includes a REF logic 554 to apply refresh within memory device(s) 540. REF logic 554, for example, may generate internal operations to perform refresh in accordance with an external refresh received from memory controller 520. REF logic 554 may determine if a refresh is directed to memory device(s) 540 and determine what memory resources 560 to refresh in response to the command.

As further illustrated, memory controller 520 includes similar logic to that shown for memory controller 200 in FIG. 2, including ingress logic 102, pattern generator 104, configuration interfaces 202, system address decoder 204, memory scrubber QoS logic 106, memory scrubber logic 108*a*, and existing logic 110. Memory controller 520 would also have provisions for generating an accessing a QoS parameters table similar to table 206 in FIG. 2 discussed above (not shown in FIG. 5).

In some embodiments, scrubbing logic may be provided on memory devices 540 and/or memory modules 570. For example, this is depicted as scrubber logic 556, which could be part of controller 550 or may comprise separate logic. In some embodiments scrubber logic 556 may enable patrol scrubbing operations to be performed in connection with memory scrubber logic 108a. In some embodiments, scrubber logic 556 may implement similar logic shown and described herein for memory scrubber logic 108a. In some embodiments, scrubber logic 556 may include an accelerator or the like that may be programmed to perform memory scrubbing operations using one or more patterns generated by pattern generator 104.

Application to Multi-tiered Memory Architectures

Figure 6:
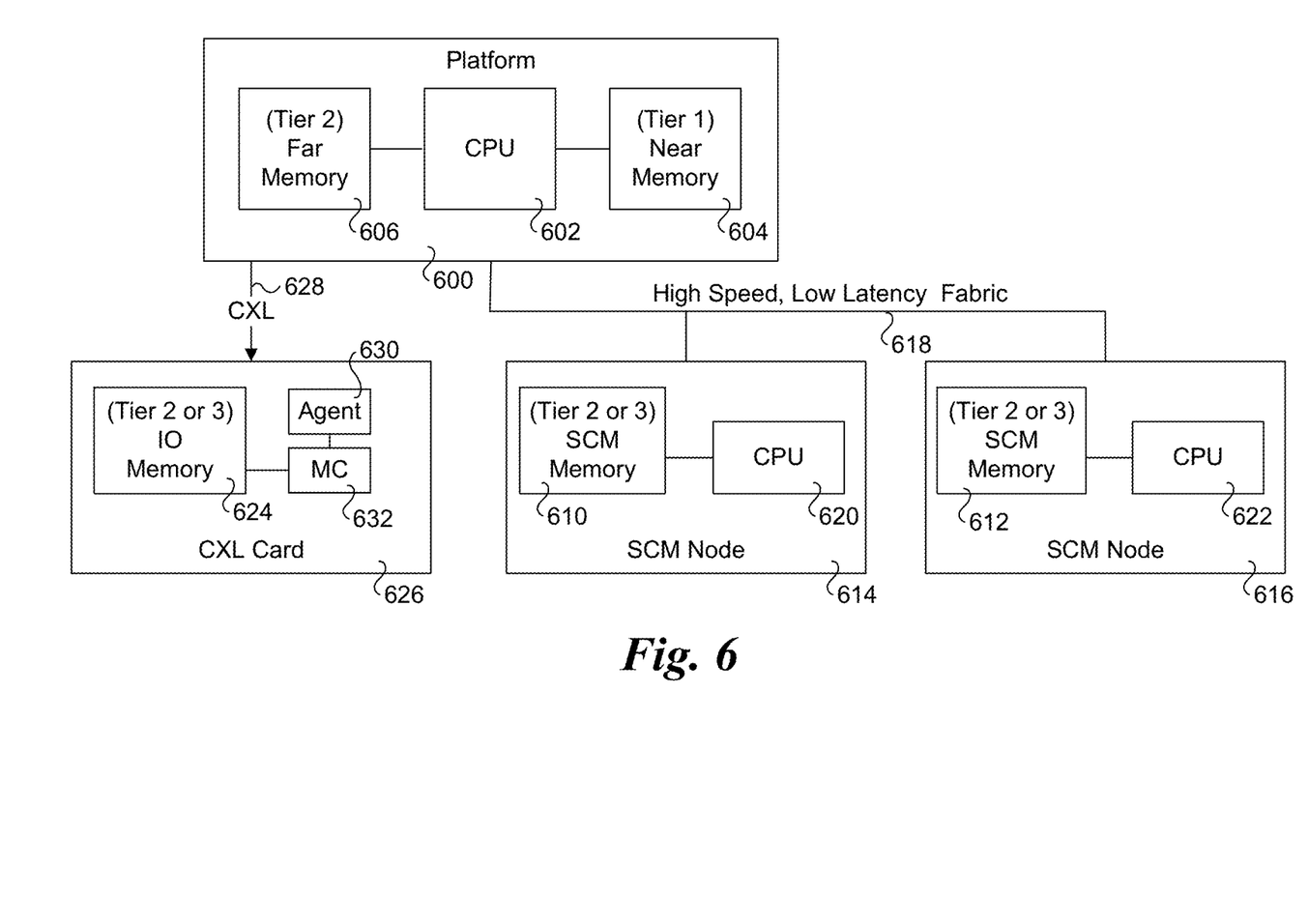
FIG. 6 is a schematic diagram illustrating an overview of a multi-tier memory scheme, according to one embodiment.

The teachings and the principles described herein may be implemented using various types of tiered memory architectures. For example, FIG. 6 illustrates an abstract view of a tiered memory architecture employing three tiers: 1) "near" memory; 2) "far" memory; and 3) SCM (storage class memory). The terminology "near" and "far" memory do not refer to the physical distance between a CPU and the associated memory device, but rather the latency and/or bandwidth for accessing data stored in the memory device. SCM memory is a type of pooled memory—when the pooled memory is located in a separate chassis, sled, or drawer or in a separate rack connected over a network or fabric the pooled memory may be referred to as remote pooled memory.

FIG. 6 shows a platform 600 including a central processing unit (CPU) 602 coupled to near memory 604 and far memory 606. Compute node 600 is further connected to SCM memory 610 and 612 in SCM memory nodes 614 and 616 which are coupled to compute node 600 via a high speed, low latency fabric 618. In the illustrated embodiment, SCM memory 610 is coupled to a CPU 620 in SCM node 614 and SMC memory 612 is coupled to a CPU 622 in SCM node 616. FIG. 6 further shows a second or third tier of memory comprising IO (Input-Output) memory 624 implemented in a CXL (Compute Express Link) card 626 coupled to platform 600 via a CXL interconnect 628. CLX card 626 further includes an agent 630 and a memory controller (MC) 632

Under one example, Tier 1 memory comprises DDR and/or HBM, Tier 2 memory comprises 3D crosspoint memory, and T3 comprises pooled SCM memory such as 3D crosspoint memory. In some embodiments, the CPU may provide a memory controller that supports access to Tier 2 memory. In some embodiments, the Tier 2 memory may comprise memory devices employing a DIM M form factor.

For CXL, agent 630 or otherwise logic in MC 632 may be provided with instructions and/or data to perform scrubbing operations on IO memory 624. For example, such instructions and/or data could be sent over CXL link 628 using a CXL protocol. For pooled SMC memory or the like, a CPU or other type of processing element (microengine, FPGA, etc.) may be provided on the SCM node and used to perform the scrubbing operations disclosed herein. Such a CPU may have a configuration similar to system 500 with a processor having an integrated memory controller or the memory controller may be separate.

Figure 7:
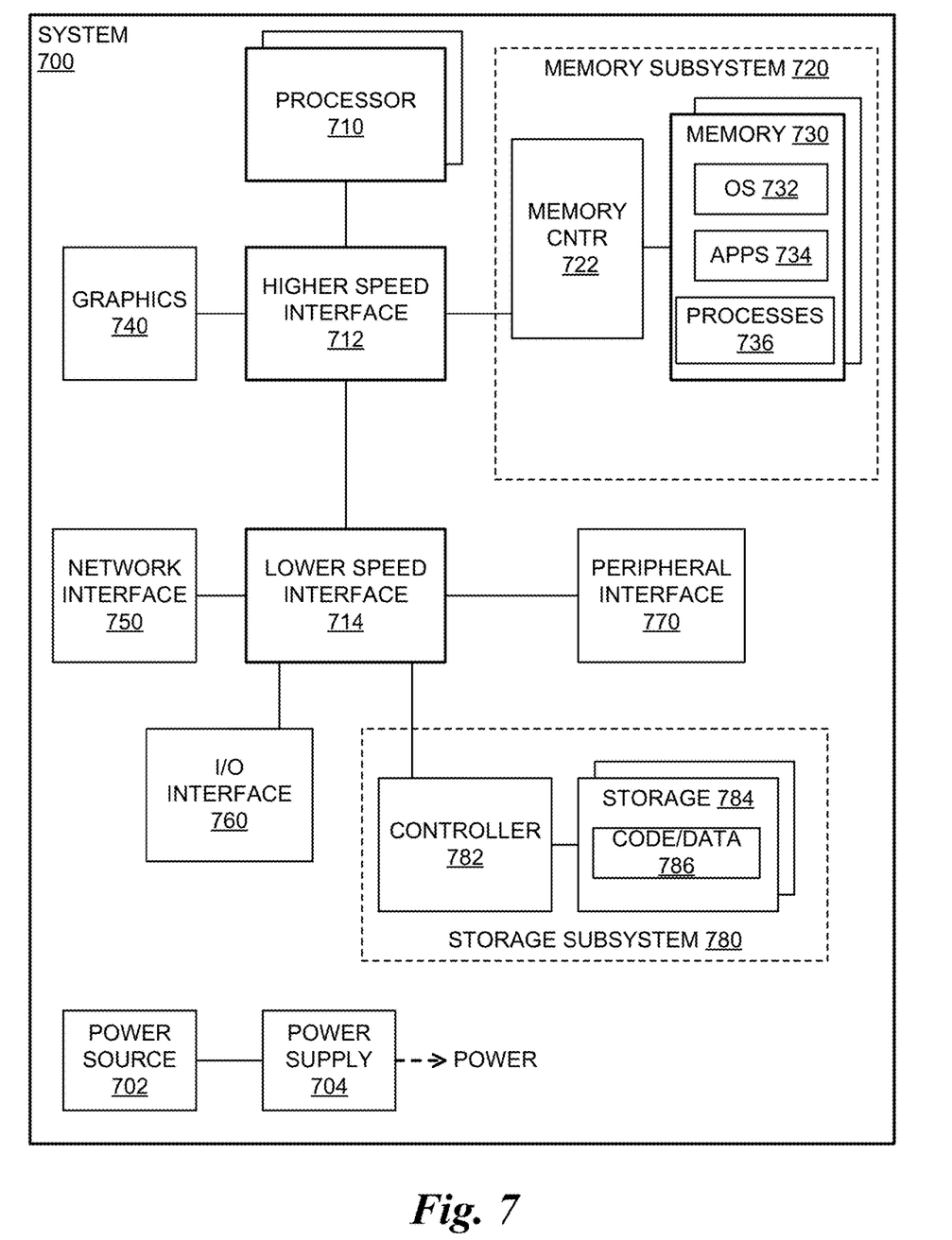
FIG. 7 is a block diagram of an exemplary system in which aspects of the embodiments disclosed herein may be implemented.

FIG. 7 illustrates an example system 700. In some examples, system 700 may be a computing system in which a memory system may implement DCA training algorithms. System 700 represents a computing device in accordance with any example described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 700 includes interface 712 coupled to processor 710, which can represent a higher speed interface or a high throughput interface for system components that needs higher bandwidth connections, such as memory subsystem 720 or graphics interface components 740. Interface 712 represents an interface circuit, which can be a standalone component or integrated onto a processor die. Where present, graphics interface 740 interfaces to graphics components for providing a visual display to a user of system 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

Memory subsystem 720 represents the main memory of system 700 and provides storage for code to be executed by processor 710, or data values to be used in executing a routine. Memory 730 of memory subsystem 720 may include one or more memory devices such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 700 includes interface 714, which can be coupled to interface 712. Interface 714 can be a lower speed interface than interface 712. In one example, interface 714 represents an interface circuit, which can include standalone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one example, system 700 includes one or more I/O interface(s) 760. I/O interface(s) 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage subsystem 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage device(s) 784 holds code or instructions and data 786 in a persistent state (i.e., the value is retained despite interruption of power to system 700). Storage device(s) 784 can be generically considered to be a "memory," although memory 730 is typically the executing or operating memory to provide instructions to processor 710. Whereas storage device(s) 784 is nonvolatile, memory 730 can include volatile memory (i.e., the value or state of the data is indeterminate if power is interrupted to system 700). In one example, storage subsystem 780 includes controller 782 to interface with storage device(s) 784. In one example controller 782 is a physical part of interface 714 or processor 710 or can include circuits or logic in both processor 710 and interface 714.

Power source 702 provides power to the components of system 700. More specifically, power source 702 typically interfaces to one or multiple power supplies 704 in system 700 to provide power to the components of system 700. In one example, power supply 704 includes an AC to DC (alternating current to direct current) adapter to plug into a wall outlet. Such AC power can be renewable energy (e.g., solar power) power source 702. In one example, power source 702 includes a DC power source, such as an external AC to DC converter. In one example, power source 702 or power supply 704 includes wireless charging hardware to charge via proximity to a charging field. In one example, power source 702 can include an internal battery or fuel cell source.

As described herein, reference to memory devices can apply to different memory types. A memory subsystem as described herein may be compatible with a number of memory technologies or standards, such as DDR3 (double data rate version 3, JESD79-3, originally published by JEDEC (Joint Electronic Device Engineering Council) on Jun. 27, 2007), DDR4 (DDR version 4, JESD79-4, originally published in September 2012 by JEDEC), LPDDR3 (low power DDR version 3, JESD209-3B, originally published in August 2013 by JEDEC), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235, originally published by JEDEC in October 2013), LPDDR5 (originally published by JEDEC in February 2019), HBM2 ((HBM version 2), originally published by JEDEC in December 2018), DDR5 (DDR version 5, originally published by JEDEC in July 2020), or others or combinations of memory technologies, and technologies based on derivatives or extensions of such specifications.

In addition to use in computing platforms and systems with processors, the teachings and principles disclosed herein may be applied to Other Processing Units (collectively termed XPUs) including one or more of Graphic Processor Units (GPUs) or General Purpose GPUs (GP-GPUs), Tensor Processing Unit (TPU) Data Processor Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of processors, this is merely exemplary and non-limiting. Generally, any type of XPU may be used in place of a processor in the illustrated embodiments. Moreover, as used in the following claims, the term "processor" is used to generically cover processors, CPUs and various forms of XPUs.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for scrubbing memory on a computing system including one or more memory devices and running a first process or application and a second process or application, comprising:
    performing patrol scrubbing for at least a first portion of memory on a memory device that is associated with the first process or application using a first patrol scrubbing policy to correct errors that are not correctable using error correction code (ECC) algorithms; and
    performing patrol scrubbing for memory on a memory device that is associated with the second process or application using a second patrol scrubbing policy.

2. The method of claim 1, further comprising:
    allocating a first bandwidth for patrol scrubbing that is employed by the first patrol scrubbing policy; and
    allocating a second bandwidth for patrol scrubbing that is employed by the second patrol scrubbing policy.

3. The method of claim 1, further comprising:
    performing patrol scrubbing for a second portion of memory on the memory device that is associated with the first process or application using the second patrol scrubbing policy or a third patrol scrubbing policy.

4. The method of claim 1, further comprising:
    implementing a first scrubbing pattern for the first patrol scrubbing policy; and implementing a second scrubbing pattern for the second patrol scrubbing policy.

5. The method of claim 4, further comprising:
at least one of monitoring and predicting memory access patterns for the first process or application; and
generating a scrubbing pattern to be employed by the first scrubbing pattern based at least in part in view at least one of the monitored and predicted access pattern.

6. The method of claim 5, wherein the first scrubbing pattern is specified by the first process or application based on its knowledge of regions of memory that are more important.

7. The method of claim 6, wherein the computing system includes a memory controller coupled to the one or more memory devices, and wherein the first scrubbing pattern is generated by programming an accelerator embedded on the memory controller.

8. The method of claim 1, further comprising:
generating a set of Quality of Service (QoS) parameters to be applied for each of the first and second patrol scrubbing policies,
wherein the QoS parameters include an allocated bandwidth to be used for patrol scrubbing.

9. The method of claim 8, wherein the set of QoS parameters for the first patrol scrubbing policy includes a memory address range, an allocated bandwidth and indicia identifying a scrubbing pattern that is to be applied to memory in the memory address range using the allocated bandwidth.

10. The method of claim 8, wherein the method is implemented for a multi-tenant environment hosted by the computing system, and wherein the first process or application comprises an application running on a first virtual machine or container allocated to a first tenant and wherein the second process or application comprises an application running on a second virtual machine or container allocated to a second tenant.

11. A computing system, comprising:
one or more memory devices in which code and data for a plurality of applications are stored;
a processor having one or more cores on which code for two or more of the plurality of applications are executed and having an integrated memory controller coupled to the one or more memory devices configured to,
perform patrol scrubbing for at least a first portion of memory on a memory device among the one or more memory devices that is associated with a first application or process associated with the first application using a first patrol scrubbing policy to correct errors that are not correctable using error correction code (ECC) algorithms; and
perform patrol scrubbing for memory on a memory device among the one or more memory devices that is associated with a second application or process associated with the second application using a second patrol scrubbing policy.

12. The computing system of claim 11, wherein the memory controller is further configured to:
allocate a first bandwidth for patrol scrubbing that is employed by the first patrol scrubbing policy; and
allocate a second bandwidth for patrol scrubbing that is employed by the second patrol scrubbing policy.

13. The computing system of claim 11, wherein the memory controller is further configured to:
perform patrol scrubbing for a second portion of memory on the memory device that is associated with the first application or process using the second patrol scrubbing policy or a third patrol scrubbing policy.

14. The computing system of claim 11, wherein the memory controller is further configured to:
generate a first scrubbing pattern used for the first patrol scrubbing policy; and
generate a second scrubbing pattern used for the second patrol scrubbing policy.

15. The computing system of claim 14, wherein the memory controller has an embedded accelerator, and wherein the first scrubbing pattern is generated by programming the embedded accelerator.

16. A memory controller, comprising:
memory scrubber logic;
memory scrubber Quality of Service (QoS) logic;
an Input/Output (I/O) interface configured to be coupled to one or more memory devices; and
an interface to enable specification of QoS policies used by the memory scrubber QoS logic to be used for performing patrol scrubbing of memory associated with respective processes or applications to be executed in a computing system in which the memory controller is configured to be installed, the computing system including one or more memory devices, the patrol scrubbing employing the memory scrubber logic to correct errors that are not correctable using error correction code (ECC) algorithms.

17. The memory controller of claim 16, wherein a QoS policy includes an allocated bandwidth to be used when performing patrol scrubbing of memory associated with the QoS policy.

18. The memory controller of claim 16, wherein a QoS policy includes a memory address range over which the QoS policy is applied.

19. The memory controller of claim 16, further comprising a pattern generator that is configured to generate a scrubbing pattern to be used for performing memory scrubbing.

20. The memory controller of claim 19, further comprising an accelerator that is programmed by the pattern generator to perform memory scrubbing using one or more scrubbing patterns.

* * * * *